United States Patent [19]

Wong

[11] Patent Number: 5,502,162
[45] Date of Patent: Mar. 26, 1996

[54] METHOD OF TREATING STRUCTURES INCLUDING SILICONE MATERIALS

[75] Inventor: Ching-Ping Wong, Lawrenceville, N.J.

[73] Assignee: AT&T Corp., Murray Hill, N.J.

[21] Appl. No.: 247,826

[22] Filed: May 23, 1994

[51] Int. Cl.⁶ .............................. C08G 77/00; H01H 3/12
[52] U.S. Cl. .................... 528/498; 29/428; 200/341; 361/601; 361/622; 361/680; 525/474; 528/10
[58] Field of Search .................... 528/498, 10; 29/428; 525/474; 200/341; 361/601, 622, 680

[56] References Cited

PUBLICATIONS

Chemical Abstract 113:125,754 Dec. 1990.
"Polymers For Electronic Packaging", C. P. Wong, 43rd Electronic Components and Technology Conference, *Components, Hybrids and Manufacturing Technology Society*, IEEE, Dec. 1993, p. 37.

*Primary Examiner*—James J. Seidleck
*Assistant Examiner*—John M. Cooney, Jr.
*Attorney, Agent, or Firm*—Roderick B. Anderson; Robert B. Levy

[57] ABSTRACT

Problems resulting from contamination of electronic apparatus used with silicone keypads can be eliminated or substantially reduced by soaking such keypads prior to assembly in a low molecular weight liquid hydrocarbon, particularly n-hexane. Such soaking removes low molecular weight unreactive cyclics from the keypad which might otherwise contaminate the electronic apparatus.

15 Claims, 1 Drawing Sheet

000
METHOD OF TREATING STRUCTURES INCLUDING SILICONE MATERIALS

TECHNICAL FIELD

This invention relates to structures made of silicone-containing materials and, more particularly, to structures such as keypads that interact with electronic apparatus.

BACKGROUND OF THE INVENTION

For a number of years, keypad structures used for certain classes of telephone apparatus have been made of silicone elastomer, a material described in more detail, for example, in the publication, "Polymers for Electronic Packaging," C. P. Wong, 43rd Electronic Components and Technology Conference, Components, Hybrids and Manufacturing Technology Society, IEEE, 1993, incorporated herein by reference. Such a keypad, for example, may include a plurality of raised portions each displaying a different digit or other alphanumeric symbol. On the underside of each raised portion is a conductive element, such as a carbon-filled silicone portion, which is capable of completing a circuit when the raised portion is depressed by an operator. Such keypads offer advantages of low cost, ease of assembly and ease of use.

Statistical data on the use of telephone apparatus employing silicone elastomer keypads have shown a significantly high average failure rate. It is of course important that the long-term reliability and dependability of telephone apparatus be maintained as high as is possible.

SUMMARY OF THE INVENTION

I have found that the failures referred to above are caused by substances that originate in the silicone keypad. In particular, low molecular weight unreactive cyclics leach or diffuse out of the silicone keypad over time and contaminate the electronic circuitry. I have further found that these problems can be reduced or substantially eliminated by soaking the keypad prior to assembly in a low molecular weight liquid hydrocarbon, particularly n-hexane. Such soaking removes low molecular weight unreactive cyclics from the keypad and eliminates or reduces the problems resulting from such substances contacting the electronic apparatus.

These and other objects, features and benefits of the invention will be better understood from a consideration of the following detailed description taken in conjunction with the accompany drawing.

DETAILED DESCRIPTION

Figure 1:
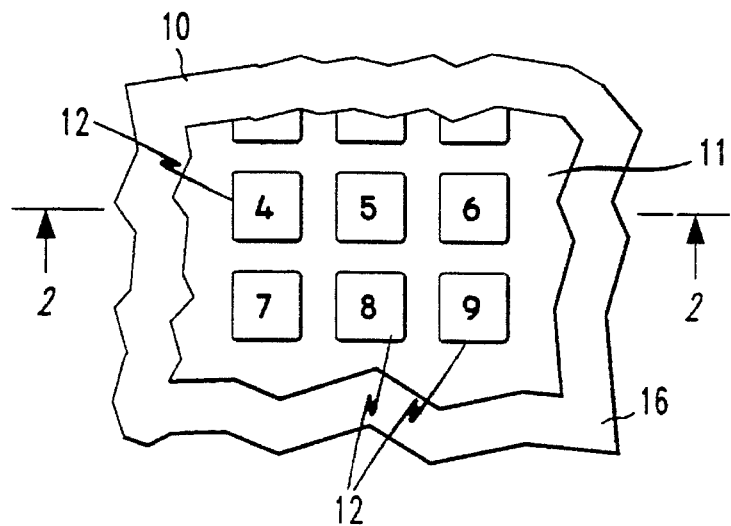
FIG. 1 is a fragmentary view of telephone apparatus, including a silicone keypad.
Figure 2:
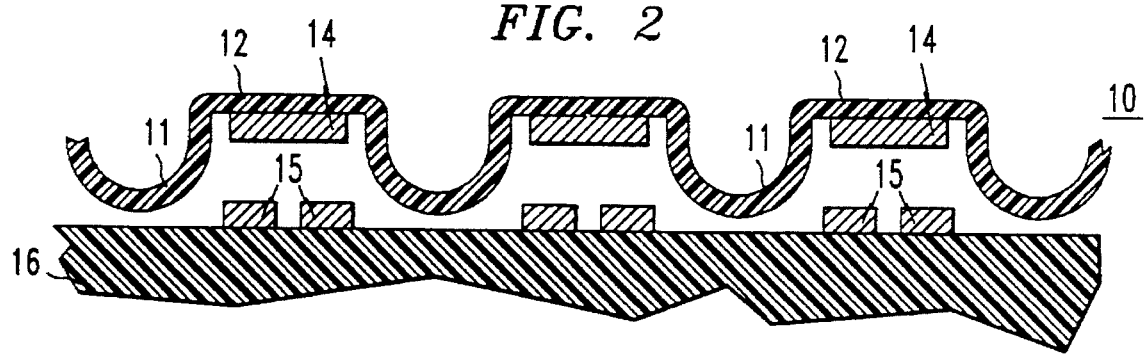
FIG. 2 is a sectional view taken along lines 2—2 of FIG. 1.

Referring now to FIGS. 1 and 2, them is shown a fragmentary and simplified view of telephone apparatus 10 comprising a silicone elastomer keypad 11. The keypad 11 comprises a plurality of raised portions 12 each displaying on one surface a digit. As shown in FIG. 2, opposite each digit is a conductive pad 14 which may comprise carbon-filled silicone. Opposite each conductive pad are a pair of electrical contacts or conductors 15 supported on an insulative substrate 16. The material from which the keypad is made may be a heat curable, peroxide catalyst, silicone elastomer as described in more detail in the aforementioned IEEE publication.

The silicone elastomer keypad 12 is of an appropriate thickness that, in its unstressed condition, it will support the conductive pads 14 spaced away from conductors 15 as shown. However, when one of the portions 12 is depressed by the finger of an operator, the corresponding conductive pad 14 will contact a pair of adjacent conductors 15 to provide electrical interconnection. When the operator's finger is removed, the resilience of the silicone elastomer causes the structure to revert to the configuration shown in FIG. 2. In this manner, the depressing of successive digits on the keypad establishes successive connections in the electronic circuitry carried by the telephone apparatus 10, thereby to provide appropriate dial signals, for example, for making a telephone call. The structure depicted in FIGS. 1 and 2 has been substantially simplified in the interest of clarity; for example, in actual apparatus that is used, several conductive pads 14 are included beneath each raised portion 12 to assure completion of a circuit regardless of the angle at which the raised portion is depressed.

Figure 3:
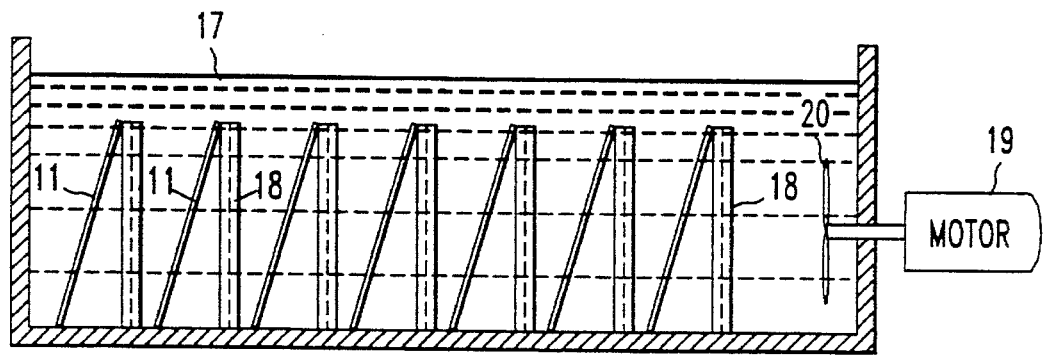
FIG. 3 is a schematic view of apparatus for soaking keypads of the type shown in FIGS. 1 and 2, in accordance with an illustrative embodiment of the invention.

As mentioned before, the telephone apparatus of FIGS. 1 and 2 tends to suffer an unusual incidence of long-term failure due to contamination of various electronic conductors of the telephone apparatus, such as conductors 15. Referring to FIG. 3, I have found that these problems can be reduced or eliminated by soaking the silicone elastomer keypads 11 in a bath 17 of n-hexane solution prior to assembly.

Untreated silicone keypads contain silicone oils that leach out over time to cause the contamination problems. The presence of such oils appears to be an inherent attribute of commercially produced silicone elastomers. These oils are unreactive low molecular weight cyclics having the form

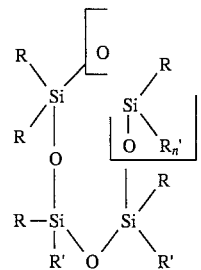

where R is a methyl or phenyl group, R' is a phenyl or methyl group that is the same or differs from R, and n is a number from zero to a number that is greater than twenty-five. When n is equal to zero, the molecule has three silicon atoms and is known as a $D_3$ molecule. When n equals five, the ring is a $D_8$ ring. In general, the unwanted cyclics range from $D_3$ to $D_{23}$. Such substances can, for example, coat and insulate conductors 15 to prevent interconnection by a conductive pad 14.

Soaking in n-hexane, as shown in FIG. 3, is effective for removing the unreactive cyclics. Illustratively, each keypad is supported by a mesh screen 18 which allows maximum contact with the bath 17. It is recommended that during soaking, the bath be agitated, as shown schematically in FIG. 3 by the connection of an agitator 20 to a motor 19. Soaking will cause the keypads to swell visibly, and drying the keypads returns them to their original configurations but without any significant component of unreactive low molecular weight cyclics. The drying may be done in an oven at one hundred forty-five degrees Centigrade for two to three hours, which is sufficient to remove the swelling. The soaking time should be determined empirically, and should be sufficient to give maximum swelling. Soaking in an agitated bath for fifteen to thirty minutes should suffice in a production environment.

In the course of arriving at the foregoing invention, I found that oven drying the keypads 11, rather than soaking them, temporarily eliminated the problem. However, with time, even such oven dried keypads tended to leach out low molecular weight cyclics. The soaking as described, particularly with agitation and for a sufficient period of time, is effective in driving out substantially all of the unreactive cyclics from the entirety of the keypad, thus to improve long-term apparatus reliability.

n-hexane is advantageous for use as the bath 17 because it is inexpensive, non-flammable, non-toxic, and poses minimal environmental complications. It is chemically related to pentane, heptane and isohexane, all of which may work. It is believed that low molecular weight alcohols such as methanol, ethanol and propanol would also work because they are capable of dissolving the low molecular weight unreactive cyclics, but such alcohols are flammable. Freon is a low molecular weight fluoro-hydrocarbon (CFC) that has been found to work, but it tends to pollute the atmosphere and is therefore generally undesirable. Thus, in general, a low molecular weight liquid hydrocarbon should be used for the bath 17, and n-hexane is the strongly preferred hydrocarbon for that purpose. Complete soaking may be hastened by agitation, but such agitation is not essential.

Electronics apparatus other than telephones, such as word processors, computer keyboards and the like, may use silicone keypads, and of course the invention is applicable to such uses. The invention may find applicability wherever the inherent low molecular weight unreactive cyclic oils of silicone elastomer materials is a problem. Low molecular weight substances are those having a molecular weight of less than about one hundred. Silicone elastomers are, in general, those having a Shore D durometer hardness of five to sixty, as opposed to silicone gels which have a smaller hardness. Various other embodiments and modifications may be made by those skilled in the art without departing from the spirit and scope of the invention.

I claim:

1. A method for making structures containing a silicone elastomer comprising the steps of:
   (a) forming a structure comprising a silicone elastomer;
   (b) immersing the structure in a low molecular weight liquid hydrocarbon that has the property of swelling the silicone and dissolving silicone oils, said immersing occurring for a period of time sufficient to cause visible swelling of the silicone material;
   (c) separating the silicone material from the hydrocarbon liquid; and
   (d) drying the silicone material to return the material to its original state before swelling.

2. The method of claim 1 wherein:
the hydrocarbon is a low molecular weight alcohol.

3. The method of claim 1 wherein:
the liquid hydrocarbon is selected from the group consisting of pentane, hexane and heptane.

4. The method of claim 3 wherein:
the liquid hydrocarbon is n-hexane.

5. The method of claim 1 wherein:
the silicone elastomer has a Shore D durometer hardness of five to sixty.

6. The method of claim 1 wherein:
the structure is a keypad;
and the structure is thereafter mounted in close proximity to electronic circuitry.

7. The method of claim 1 further comprising the step of:
agitating the bath during the immersing step.

8. The method of claim 1 further comprising the step of:
after immersing, drying the structure by baking it in an oven.

9. The method of claim 3 wherein:
said structure is immersed in said hydrocarbon for more than fifteen minutes and is thereafter dried.

10. A method of making an electronic apparatus comprising the steps of:
   (a) forming a keypad comprising silicone elastomer material;
   (b) assembling the keypad over an electronic circuit such that depressing portions of the keypad will affect conducting characteristics of portions of the electronic circuit; wherein the improvement comprises:
   prior to the assembly step, immersing the keypad in a low molecular weight liquid hydrocarbon that has the property of swelling the silicone and dissolving silicone oils, said immersing occurring for a period of time sufficient to cause visible swelling of the silicone material:
   (c) separating the silicone material from the hydrocarbon liquid; and
   (d) drying the silicone material to return the material to its original state before swelling.

11. The method of claim 10 wherein:
the dressing step comprises baking the keypad in an oven at about one hundred forty-five degrees Centigrade for two to three hours.

12. The method of claim 10:
the liquid hydrocarbon is selected from the group consisting of pentane, hexane, and heptane.

13. The method of claim 12 wherein:
the liquid hydrocarbon is n-hexane.

14. The method of claim 13 further comprising the step of:
agitating the hydrocarbon during the immersing step.

15. The method of claim 14 wherein:
the immersing step comprises immersing the keypad in agitated n-hexane for more than fifteen minutes.

\* \* \* \* \*